(12) United States Patent
Kurtz et al.

(10) Patent No.: US 7,124,639 B1
(45) Date of Patent: Oct. 24, 2006

(54) ULTRA HIGH TEMPERATURE HERMETICALLY PROTECTED WIREBONDED PIEZORESISTIVE TRANSDUCER

(75) Inventors: Anthony D. Kurtz, Saddle River, NJ (US); Alexander A. Ned, Wayne, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 0 days.

(21) Appl. No.: 11/157,615

(22) Filed: Jun. 21, 2005

(51) Int. Cl.
*G01L 19/04* (2006.01)

(52) U.S. Cl. ............... 73/708; 73/753; 73/754

(58) Field of Classification Search ........... 73/700–756
See application file for complete search history.

(56) References Cited

U.S. PATENT DOCUMENTS

| | | | | |
|---|---|---|---|---|
| 4,063,209 A | * | 12/1977 | Kurtz et al. | 338/4 |
| 4,462,018 A | * | 7/1984 | Yang et al. | 338/3 |
| 4,672,354 A | * | 6/1987 | Kurtz et al. | 338/4 |
| 4,777,826 A | * | 10/1988 | Rud et al. | 73/708 |
| 4,814,856 A | * | 3/1989 | Kurtz et al. | 338/4 |
| 5,184,515 A | * | 2/1993 | Terry et al. | 73/727 |
| 5,209,118 A | * | 5/1993 | Jerman | 73/715 |
| 5,286,671 A | * | 2/1994 | Kurtz et al. | 438/50 |
| 5,955,771 A | | 9/1999 | Kurtz et al. | |
| 5,973,590 A | | 10/1999 | Kurtz et al. | |
| 6,210,989 B1 | | 4/2001 | Kurtz et al. | |

\* cited by examiner

*Primary Examiner*—Edward Lefkowitz
*Assistant Examiner*—Jermaine Jenkins
(74) *Attorney, Agent, or Firm*—Plevy, Howard & Darcy, PC

(57) ABSTRACT

An ultra high temperature hermetically protected transducer includes a sensor chip having an active area upon which is deposited piezoresistive sensing elements. The elements are located on the top surface of the silicon wafer chip and have leads and terminals extending from the active area of the chip. The active area is surrounded with an extending rim or frame. The active area is coated with an oxide layer which passivates the piezoresistive sensing network. The chip is then attached to a glass pedestal, which is larger in size than the sensor chip. The glass pedestal has a through hole or aperture at each corner. The entire composite structure is then mounted onto a high temperature header with the metallized regions of the header being exposed to the holes in the glass pedestal; a high temperature lead is then bonded directly to the metallized contact area of the sensor chip at one end. The leads are of sufficient length to extend into the through holes in the glass pedestal. A sealing cover is then attached to the entire composite sensor to hermetically seal all of the interconnections. The sealing cover is a glass structure, has a central aperture which corresponds to the aperture formed by the frame, allowing the active area of the sensor to be exposed to the pressure medium. The sealing cover is bonded to the periphery of the rim and to the glass supporting pedestal.

20 Claims, 4 Drawing Sheets

ULTRA HIGH TEMPERATURE HERMETICALLY PROTECTED WIREBONDED PIEZORESISTIVE TRANSDUCER

FIELD OF THE INVENTION

This invention relates, in general, to pressure transducers and more particularly to a pressure transducer capable of operating at high temperatures and being hermetically sealed.

BACKGROUND OF THE INVENTION

There is a great desire to utilize pressure transducers in harsh environments. In such environments, apart from deleterious substances which may destroy the transducer, there are others factors which are involved. Such factors include high temperatures, such as those temperatures which are found in various engines such as automobile engines, jet engines and so on. In other applications such as the use of pressure transducers in injection molding and for other environments, extremely high temperatures are found. In regard to such operations transducers have been fabricated which operate in excess of 600° C. As one can readily ascertain it would be desirable to provide a transducer capable of operation at even higher temperatures while further being protected from deleterious environments, such as those environments containing noxious gases as well as various harsh chemicals. The prior art cognizant to those problems utilized transducers which involved the use of silicon. On the silicon wafer an oxide layer was formed. This oxide layer produced a silicon on oxide sensor. This sensor had appropriate high temperature platinum based metallization and was bonded to a glass wafer, such as a low expansion borosilicate glass. The borosilicate glass wafer had apertures which extended to the platinum based contact regions on the silicon wafer. Contact was made to the platinum region of the silicon wafer by means of a metallic frit and contact was made to the metallic frit by very short pins. This work was performed by Kulite Semiconductor Products, the assignee herein. For examples of such prior art device reference is made to U.S. Pat. No. 5,955,771, entitled "Sensor for Use in High Vibrational Applications and Methods for Fabricating the Same". The patent issued to Anthony D. Kurtz et al. on Sep. 21, 1999 and is assigned to the assignee herein. Other examples of such sensors can be had by referring to U.S. Pat. No. 5,973,590 entitled "Ultra Thin Surface Mount Wafer Sensor Structures and Methods for Fabricating the Same" issued to Kurtz on Oct. 26, 1999. A further patent of interest is U.S. Pat. No. 6,210,989, also entitled "Ultra Thin Surface Mount Wafer Sensor Structures and Methods for Fabrication", issued to Kurtz et al. on Apr. 3, 2001. In the prior designs, there are described extremely high temperature operation transducers, which serve to operate in very harsh environments. The upper limit of the bond which is the interconnection between the platinum metallization on the silicon sensor wafer and the conductive glass metallic frit was, in the prior designs, approximately 600° C. By bonding appropriate small diameter wires, such as platinum wires to the platinum metallization on the contacts, the upper temperature ranges could be extended to over 700° C. These sensors are state of the art sensors which exhibit extremely high temperature operation.

It is desirable to obtain an improved transducer which is capable of operating at temperatures in excess of 700° C., which transducer further provides hermetic sealing in regard to the operating environment.

SUMMARY OF THE INVENTION

A high temperature sensor comprises a silicon wafer having piezoresistive elements located on the top surface within an active area of the wafer, the bottom surface of the wafer having a depressed region defining the active area to thin the wafer at the active area. Contact terminals are each connected to an associated piezoresistive element and extend from the active area towards the periphery of the wafer. A frame surrounds the active area, which frame opening surrounds the piezoresistive elements. A glass wafer has a plurality of through apertures each associated with one contact terminal of the silicon wafer and each located near the periphery of the glass wafer, the glass wafer being larger than the silicon wafer, so that when the silicon wafer is bonded to the glass wafer at a peripheral portion of the glass wafer to the frame, to enable access to the through apertures. The silicon and glass wafer when bonded together form a composite member structure. A plurality of leads each connected at one end to an associated contact terminal of the silicon wafer and directed at the other end into and extending from an associated through hole. A cover member has a central opening corresponding to the frame opening, the cover member bonded to the periphery of the frame about the periphery of the central opening to the glass wafer and the semi-conductor wafer with the opening allowing a pressure to be applied to the active area, the cover member sealing the composite member structure while exposing the active area. The completed device is then connected to a header which has terminals aligned with the through holes to enable the other end of each wire to be connected to a terminal of the header, thereby providing a high temperature transducer with hermetic sealing.

DETAILED DESCRIPTION OF THE FIGURES

It is to be understood that the figures and descriptions have been simplified to illustrate elements that are relevant for a clear understanding of the present invention, while eliminating, for purposes of clarity, many other elements found in typical transducer devices and methods of making and using the same. Those of ordinary skill in the art will recognize that other elements are desirable and/or required in order to implement the present invention. However, because such elements are well known in the art, and/or because they do not facilitate a better understanding of the present invention, a detailed discussion of such elements is not provided herein.

Figure 1:
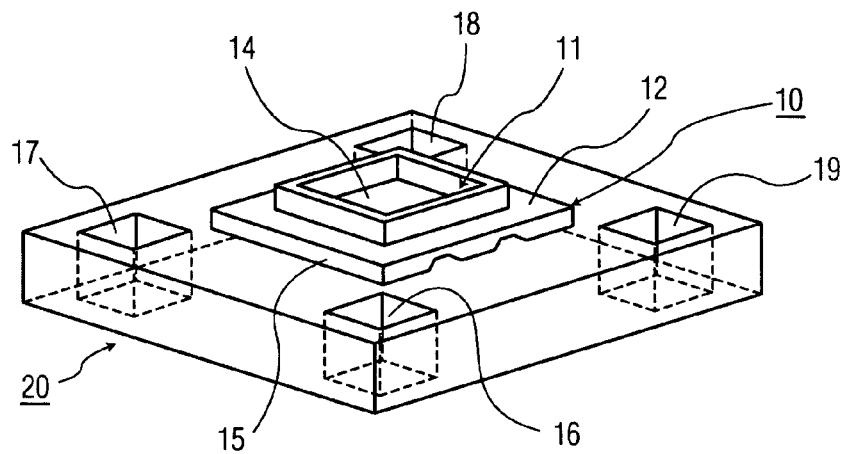
FIG. 1 is a perspective view of a sensing element according to this invention.

Referring to FIG. 1 there is shown a sensor structure or element, which is utilized and employed with this invention. Numeral 10 references a silicon sensor chip which is shown in greater detail in FIG. 6. Such silicon sensor chips are well known. The silicon sensor chip 10 has a plurality of piezoresistive elements fabricated on the top surface of the silicon chip. The top surface 12, therefore contains a bridge configuration, as a full Wheatstone bridge or a half bridge arrangement, incorporated on the top surface 12 of the silicon sensor and positioned within a central region 14 designated as the active area of the sensor. The active area 14 of such sensors is the area which deflects upon application of a force. The silicon sensors are also associated with contacts which are also positioned on a top surface 12. The contact areas extend from the active region towards the peripheral region of the silicon sensor. This region is normally referred to as a non-active region and basically is a region of the silicon sensor which does not readily deflect upon application of a force thereto. In order to operate at high temperatures, the entire surface 12 after fabrication of the piezoresistive elements and the contacts is coated with an oxide layer. The oxide layer passivates the entire piezoresistive sensing network. The covering of active regions with a passivating layer of silicon dioxide is well known in the prior art. As one can ascertain from FIG. 1 there is a cover frame 11, which essentially is an extended frame like structure extending from the top surface 12 of the silicon sensor and having a central frame opening which essentially surrounds the active region 14 of the sensor. Thus the frame 11 is a peripheral frame or an annular frame being relatively square in shape. The frame 11 extends from the silicon wafer surface 12 and surrounds the active area of the silicon sensor chip as shown in FIG. 1. The silicon sensor chip is now attached to a glass pedestal member 20. The glass pedestal member 20 has a central aperture 15 for accommodating the silicon sensor. The glass pedestal member 20 is larger in size than the sensor chip 10 while containing four through holes indicated as 16, 17, 18 and 19. One through hole is located at each corner of the sensor chip 10. These through holes will accommodate wires to enable one to contact the piezoresistive elements on the silicon sensor chip 10 by making contact with the appropriate contacts associated with the piezoresistive elements. The semiconductor wafer may be symmetrically positioned on the top surface of the insulating wafer to enable access to the through apertures on said the surface. The entire composite structure as shown in FIG. 1 is then mounted to an appropriate high temperature header or flat pack, with the metallized regions as the pads or pins being exposed through the through holes 16, 17, 18 and 19 in the glass pedestal 20. It is understood that the configuration shown in FIG. 1 depicts a rectangular silicon sensor chip and a rectangular or square cover frame 11 with a rectangular or square glass pedestal 20. It is understood that any other geometric shape can be employed as the shape of the sensor structures and the various elements are not essential to the operation of this invention. Thus as one can ascertain the extending frame member, for example 11, may be circular in configuration or of any other configuration and such geometric configurations can be used in conjunction with a square silicon chip, with a circular silicon chip or a chip of another geometric configuration.

Figure 2:
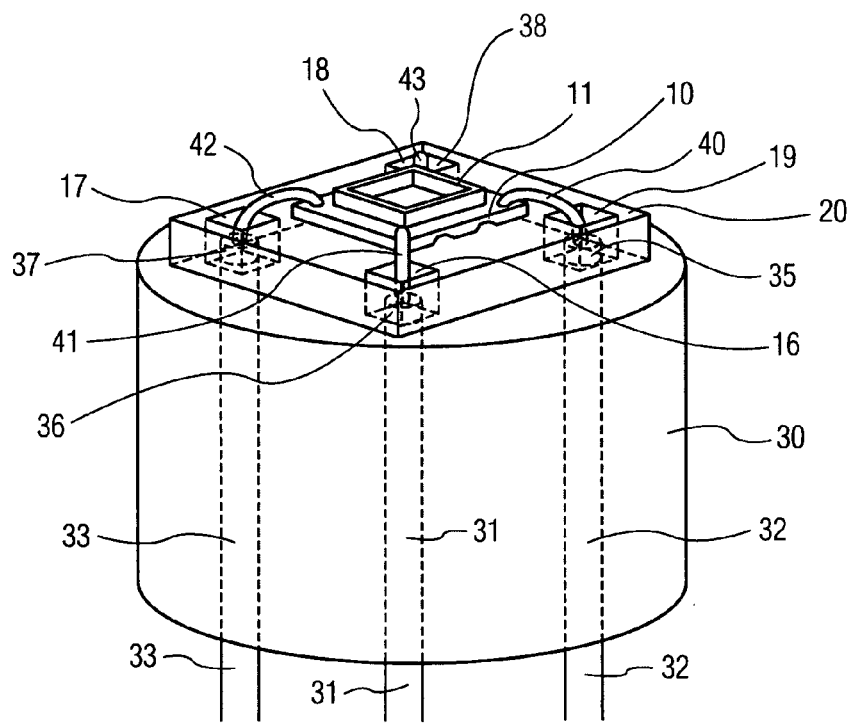
FIG. 2 is a perspective view of the sensing element mounted on a header, according to this invention.

Referring to FIG. 2 there is shown the sensor element depicted in FIG. 1 mounted to a header 30 configured as a high temperature header. In FIG. 2 the same reference numerals have been utilized as in FIG. 1 to designate like parts. As seen from FIG. 2 the sensing element containing the silicon sensor chip 10 with the glass wafer 20 and the peripheral frame 11 surrounding the active area of the sensor are mounted on the high temperature header 30. The header 30 may be a transistor type header or any other type of header fabricated from a high temperature material such as an alloy of iron, nickel and cobalt having a trade name of Kovar, or glass or some other high temperature material. As seen the header is associated with terminal pads 35, 36, 37 and 38. Each terminal pad is coupled to the appropriate contact on a sensor chip via a high temperature wire, such as wires 40, 41, 42 and 43. Each terminal pad is coextensive or directly coupled to a pin, such as pins 31, 32, 33 and 34, associated with each of the contacts on the silicon sensor. In this manner the silicon sensor contacts are bonded to the wires indicated as 40, 41, 42 and 43, at one end which are in turn bonded to or connected corresponding ones of terminal pads 35–38 at the other end associated with the high temperature header 30. Each terminal pad is associated with a corresponding pin such as pins 31, 32, 33, 34. In the illustrated embodiment, terminal pad 35 is associated with pin 32, pad 36 is associated with pin 31, pad 37 is associated with pin 33, and pad 38 is associated with pin 34. These pins can be inserted into a typical socket or can be wired directly into a circuit as is well known in the art.

Figure 3:
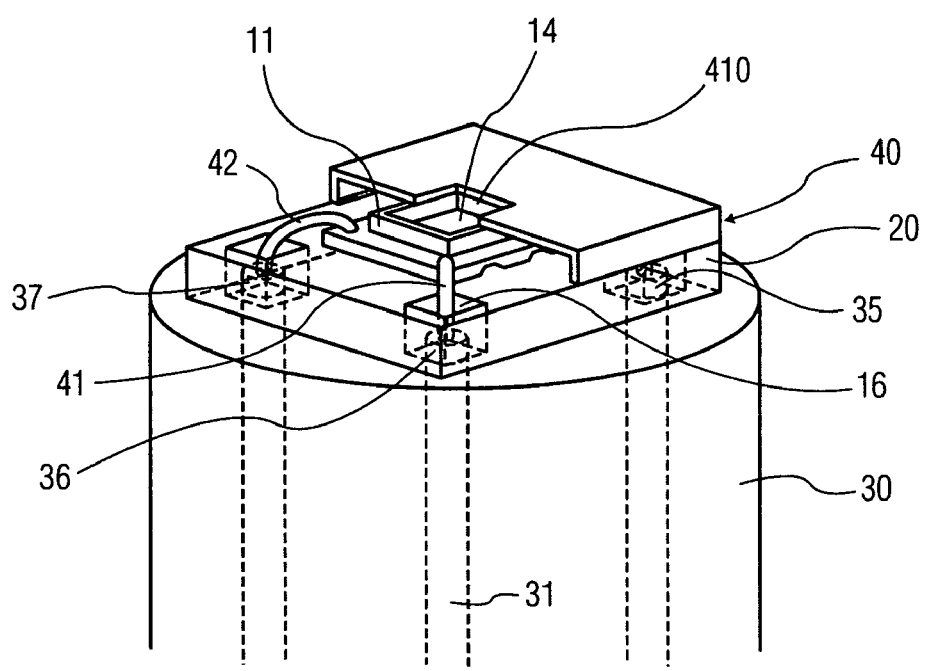
FIG. 3 is an isometric view of the sensing element as mounted on the header to more clearly show some of the details.
Figure 4:
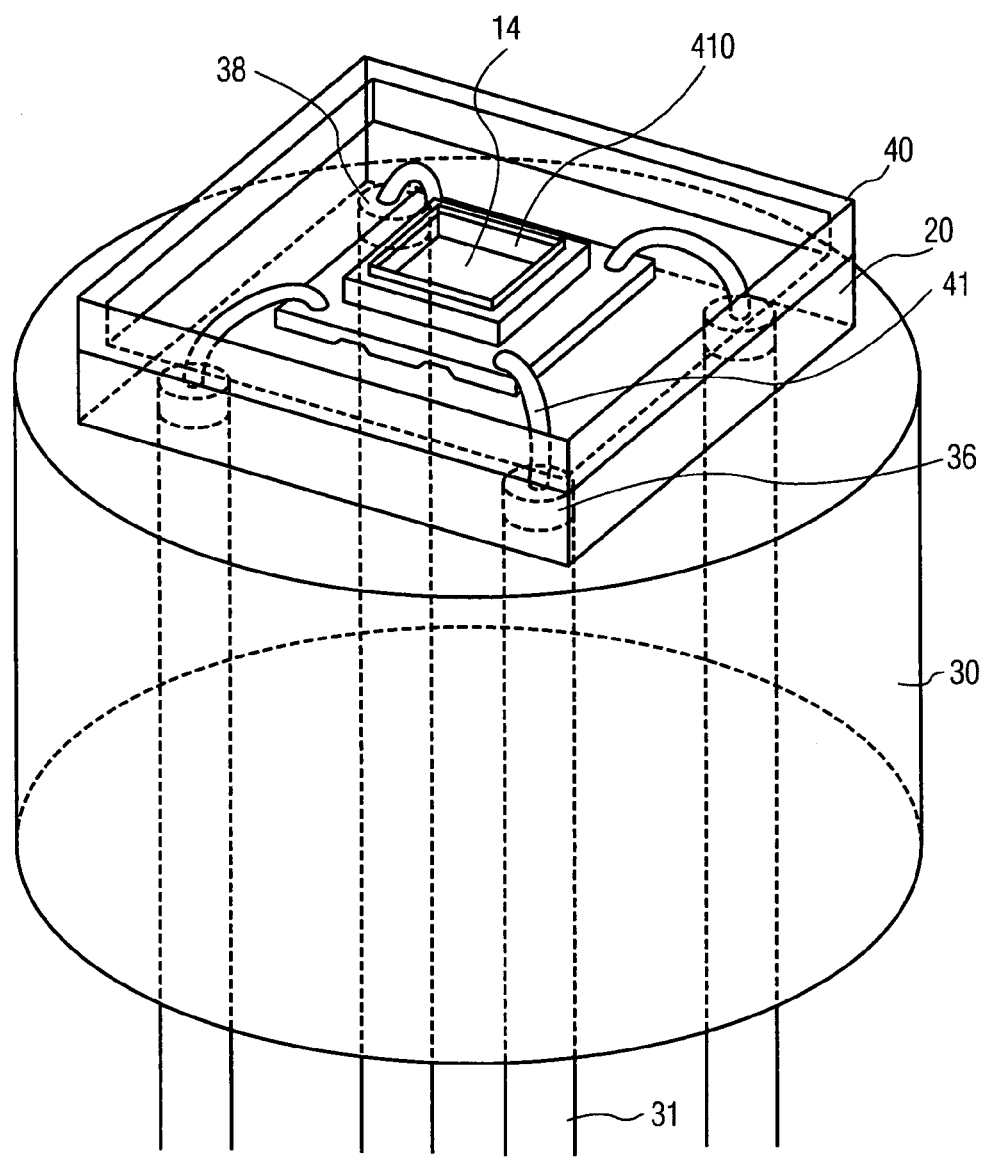
FIG. 4 is a perspective view of a fully assembled sensing element including a cover member.
Figure 5:
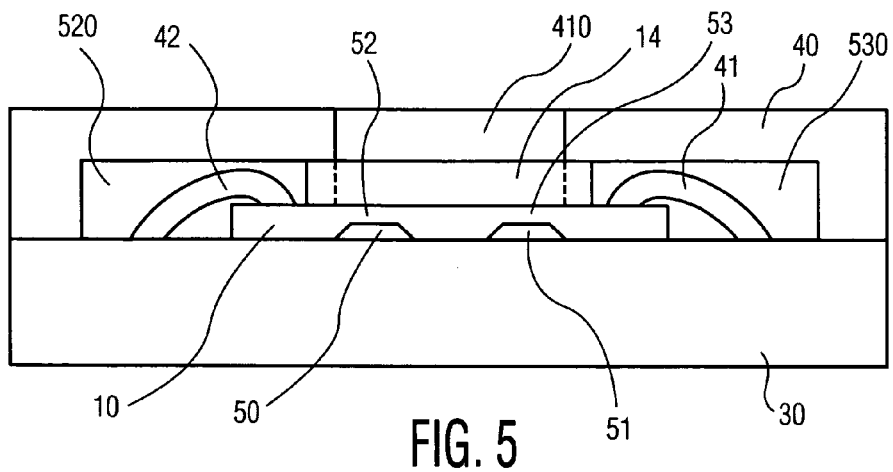
FIG. 5 is a cross sectional view of a sensing element according to this invention.

FIG. 3 shows the composite structure that now contains a sealing cover 40 which is emplaced to cover the entire composite structure and to hermetically seal all of the interconnections. Referring to FIG. 3 there is shown a partial view of the sealing cover 40 associated with the composite sensor structure of this invention. Reference numerals in FIG. 3 depicting the same structure as in FIGS. 1 and 2 have been repeated. The sealing cover 40 is attached to the entire composite sensor assembly to hermetically seal all of the interconnections. The sealing cover 40 is a glass structure and has an aperture located therein designated by reference numeral 410. The aperture 410 surrounds the active area of the sensor structure and essentially bounds the periphery of the frame 11 and is coextensive with the periphery of the frame. Thus the sealing cover 40 having the central opening 410 enables the active area 14 of the sensor 10 to be exposed to the pressure media. The cover 40 is attached to both the rim 11 on the sensor and to the periphery of the glass pedestal or glass wafer 20. The cover member 40 surrounds the periphery of the glass wafer and essentially the cover member is of the same size as the glass wafer and sits up on top of the glass wafer (FIG. 5). The sealing cover 40 is attached to the extending rim 11 and to the peripheral surface of the glass wafer 20 by means of a high temperature seal. This seal may be an electrostatic bond or may further be a high temperature glass frit, which constitutes a high temperature seal or bond, such high temperature bond being known in the prior art. FIG. 4 provides a perspective view of the assembled transducer with cover member 40 surrounding the periphery of the glass wafer with aperture 410 for enabling exposure of the active area 14 to the pressure media.

Referring to FIG. 5 there is shown a cross sectional view depicting the composite transducer element. The glass wafer 30 is secured to the silicon wafer 10. The wafer 10 has reduced thinned areas underlying the apertures 50 and 51 to enable areas 52 and 53 to deflect. Areas 52 and 53 are the active areas of the silicon sensor and within those areas the piezoresistive elements are mounted. There is shown the glass cover member 40 which covers the silicon sensor 10. The aperture 410 of the cover member surrounds the active area. The high temperature wires 41 and 42 are bonded to contacts on the silicon wafer 10 and then directed through the apertures in the glass wafer 30 to eventually be connected to the terminals associated with the header as previously shown for example in FIGS. 2 and 3. The glass cover member 40 is depicted having a central aperture 410. The glass cover member 40 is bonded to the glass wafer 30 as shown in FIG. 5.

Figure 6:
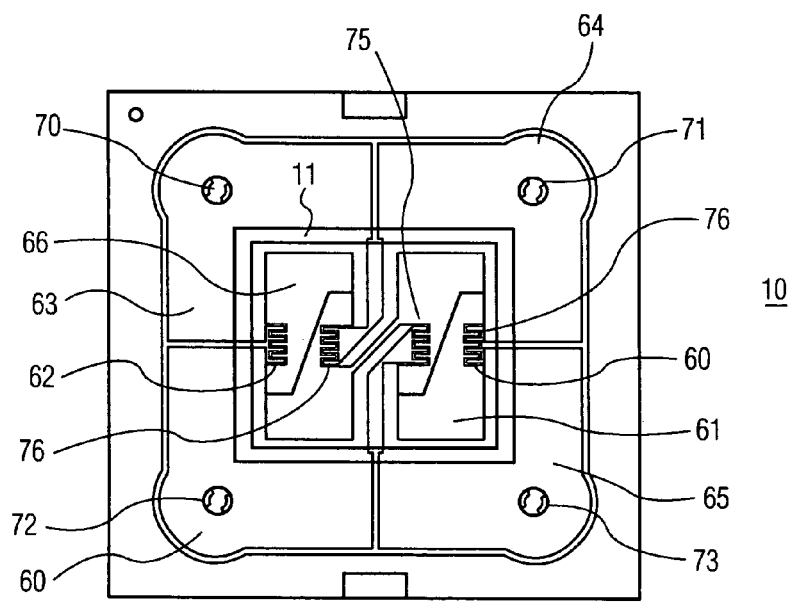
FIG. 6 is a top plan view of a sensor, which is utilized in combination with the header and cover member of this invention.

Referring to FIG. 6 there is shown a top view of a typical silicon sensor, element 10. As seen the structure 10 has piezoresistors as 60 and 62, located on active areas 61 and 66. The piezoresistors for example, 60 and 62 are contained within the active areas defined for example by the apertures 50 and 51 shown in FIG. 5. Each piezoresistor is connected to contact areas such as 63, 71, 65 and 60. Each contact area is associated with a platinum contact as 72, 70 and 73. These are the contacts that are directed and coupled to the wires such as 40 and 41. Thus wire 41 for example, would be connected to contact area 73 and then to the contact associated with the header. The rim or frame 11 surrounds the active area and is shown in FIG. 6. Secured to the sensor structure is the frame 11 which surrounds the active area 14 upon which the piezoresistors 62 and 60 as well as piezoresistors 75 and 76 are located. The resistors are wired to form a Wheatstone bridge and the large contact areas 63, 64, 65 and 60 are p+ areas and associated with the metallized platinum contacts as 70, 71, 72 and 73, which contacts as indicated are connected to an associated high temperature wire. It is seen that the glass cover member as shown in FIG. 5 has internal apertures 520 and 530 to accommodate and to enable the wires 42 and 41 to pass unimpeded to the through apertures of the glass wafer 30. It is also understood that the sealing glass cover plate 40 could have a series of slots or depressions in the cover glass, such that the slots or depressions provide means of retaining or securing the wires 41 and 42 as they pass from the sensor contacts 70, 72 to the pins or pads on the header flat packs. These are shown in FIG. 2 as contacts 36 and 37. As seen again in FIG. 5, once the sealing cover 40 is attached, only the sensing active area of the chip is exposed to the pressure media, while all other components including the header, flat pack, pins and pads are hermetically sealed. This device can withstand temperatures in excess of 700° C. and higher and be suitable for harsh environmental operability. The sensor element shown in FIG. 6 has the entire active area covered with a layer of silicon dioxide to further prevent contamination from the environment. The frame 11 is secured to the sensor by conventional means which may include a high temperature bond or expoxy. The bond may be implemented by an electrostatic bond. As one can ascertain the structure allows extremely high temperature operation with hermetic sealing.

Thus, an ultra high temperature hermetically protected transducer includes a sensor chip having an active area upon which is deposited piezoresistive sensing elements. The elements are located on the top surface of the silicon wafer chip and have leads and terminals extending from the active area of the chip. The active area is surrounded with an extending rim or frame. The active area is coated with an oxide layer which passivates the piezoresistive sensing network. The chip is then attached to a glass pedestal, which is larger in size than the sensor chip. The glass pedestal has a through hole or aperture at each corner. The entire composite structure is then mounted onto a high temperature header with the metallized regions of the header being exposed to the holes in the glass pedestal; a high temperature lead is then bonded directly to the metallized contact area of the sensor chip at one end. The leads are of sufficient length to extend into the through holes in the glass pedestal. They are then bonded to the underlying metal regions of the header at the other end. A sealing cover is then attached to the entire composite sensor to hermetically seal all of the interconnections. The sealing cover is a glass structure, has a central aperture which corresponds to the aperture formed by the frame, allowing the active area of the sensor to be exposed to the pressure medium. The sealing cover is bonded to the periphery of the rim and to the glass supporting pedestal. In this manner there is provided a high temperature transducer, which is capable of operating in harsh environments.

It is to be understood that the form of this invention as shown is merely an exemplary embodiment. Various changes may be made in the function and arrangement of parts; equivalent means may be substituted for those illustrated and described; and certain features may be used independently from others without departing from the spirit and scope of the invention as defined in the following claims.

What is claimed is:

1. A high temperature pressure transducer, comprising:
a wafer of semiconductor material having a given surface area, and having positioned on a top surface of said wafer a plurality of pressure sensitive elements located within an active area, said active area capable of deflecting upon application of a force thereto, an opposite surface of said wafer including indented regions of a sufficient area to form said active area due to the thinning of said wafer at said indented regions;
a plurality of contact terminals each coupled to an associated pressure sensitive element and extending towards the periphery of said wafer and located on the thicker portion of said wafer remote from said active area;
a frame located on said top surface of said wafer and surrounding said active area, said frame opening bounding said pressure sensitive elements within said active area;
an insulating wafer of a larger area than said semiconductor wafer, said insulating wafer having a plurality of through apertures each near the periphery of said insulating wafer and each associated with a contact terminal of said semiconductor wafer, said semiconductor wafer positioned on said top surface of said insulating wafer to enable access to said through apertures on said top surface, said wafers forming a composite structure;
a high temperature header having contact regions, each region positioned to accommodate an associated through aperture when said composite structure is mounted on said header and means for mounting said composite structure on said header;
a plurality of high temperature wires, each connected to an associated contact on said semiconductor wafer at one end and directed through said through aperture and connected to said header contact region at said other end; and
an insulating cover member having a central opening corresponding to said frame opening, said cover member bonded to said frame about the periphery of said central opening and bonded about the peripheral edge to said insulating wafer to hermetically seal said semiconductor wafer to said insulating wafer.

2. The high temperature transducer according to claim 1, wherein said wafer of semiconductor is a wafer of silicon with said pressure sensitive elements being piezoresistors formed on said silicon wafer.

3. The high temperature transducer according to claim 2, wherein said active area is passivated with a layer of silicon dioxide covering said piezoresistors.

4. The high temperature transducer according to claim 2, wherein said contact terminals are p+ silicon each having a platinum contact region for connecting to an associated wire.

5. The high temperature transducer according to claim 1, wherein said frame is a semiconductor frame formed about said active area.

6. The high temperature transducer according to claim 1, wherein said frame is a glass frame bonded to said semiconductor wafer and surrounding said active area.

7. The high temperature transducer according to claim 1, wherein said insulating wafer is a high temperature glass wafer bonded to said semiconductor wafer to symmetrically position said semiconductor wafer on said glass wafer.

8. The high temperature transducer according to claim 7, wherein said high temperature glass is a low expansion borosilicate material.

9. The high temperature transducer according to claim 8, wherein said insulating glass wafer is bonded to said semiconductor wafer by an electrostatic bond.

10. The high temperature transducer according to claim 1, wherein said semiconductor wafer, said frame and said insulating wafer are generally rectangular in shape, with said insulating wafer having a through hole in each corner.

11. The high temperature transducer according to claim 1, wherein said header is a flat-pack header.

12. The high temperature transducer according to claim 1, wherein said cover member is fabricated from a high temperature glass and is bonded to said frame and said insulating wafer by an electrostatic bond.

13. The high temperature transducer according to claim 12, wherein said high temperature glass is a low expansion borosilicate material.

14. A high temperature composite sensor member structure comprising:
   a silicon wafer having a plurality of piezoresistive elements located on a top surface within an active area of said wafer said bottom surface having a depressed region defining said active area said depressed region operative to thin said wafer at said active area;
   a plurality of contact terminals each connected to an associated piezoresistive element extending from said active area towards the periphery of said wafer;
   a frame surrounding said active area, with said frame opening bounding said piezoresistive elements within said active area;
   a glass wafer having a plurality of through apertures each associated with one contact terminal of said silicon wafer and each located near the periphery of said glass wafer, said glass wafer being larger than said silicon wafer, with said silicon wafer bonded to said glass wafer to enable a peripheral portion of said glass wafer to frame said silicon wafer to enable access to said through apertures;
   a plurality of leads each connected at one end to an associated contact terminal of said silicon wafer and directed at said other end into and extending from an associated through hole; and
   a cover member having a central opening corresponding to said frame opening, said cover member bonded to the periphery of said frame about the periphery of said central opening and bonded to said glass wafer about the periphery thereof to cover said glass wafer, with said opening allowing a pressure to be applied to said active area, said cover member sealing said composite member structure while exposing said active area.

15. The composite sensor according to claim 14, wherein said active area within said frame opening is passivated by depositing a layer of silicon dioxide to cover said piezoresistive elements.

16. The composite sensor according to claim 14 further comprising:
   a high temperature header having terminal areas located on a surface with each area associated and positioned to encircle an associated through aperture of said glass wafer, said composite wafer mounted on said surface of said high temperature header with an associated lead connected to an associated terminal area of said header when said composite member is mounted on said header surface.

17. The composite structure according to claim 14 wherein said cover member is fabricated from a high temperature glass.

18. The composite structure according to claim 17 wherein said cover member is bonded to said frame and said glass wafer by an electrostatic bond.

19. The composite structure according to claim 14 wherein said contact terminals on said silicon wafer are platinum metallized contacts.

20. The composite structure according to claim 14, wherein said silicon wafer, said glass wafer and said frame are rectangular in shape, with said glass wafer having a through hole at each corner near the periphery.

* * * * *